US005832757A

United States Patent [19]

[11] Patent Number: 5,832,757
[45] Date of Patent: Nov. 10, 1998

Chikata et al.

[54] LATCH DEVICE FOR A VEHICLE

[75] Inventors: Koji Chikata, Tochigi-ken; Ryuko Hanaya, Saitama; Makoto Imada, Wako, all of Japan

[73] Assignees: Mitsui Kinzoku Kogyo Kabushiki Kaisha; Honda Giken Kogyo Kabushiki Kaisha, both of Tokyo, Japan

[21] Appl. No.: 917,377

[22] Filed: Aug. 26, 1997

[30] Foreign Application Priority Data

Aug. 27, 1996 [JP] Japan .................................. 8-244249

[51] Int. Cl.[6] ........................... B62D 33/08; E05B 13/00

[52] U.S. Cl. ............................... 70/210; 70/279; 70/283; 292/216; 292/DIG. 5; 296/26.06; 296/176

[58] Field of Search ............................ 70/210, 256, 257, 70/279, 283; 292/216, DIG. 5, DIG. 14, DIG. 36, DIG. 43; 296/26.04, 26.06, 165, 172, 176

[56] References Cited

U.S. PATENT DOCUMENTS

| | | | |
|---|---|---|---|
| 2,246,793 | 6/1941 | Dall | 292/DIG. 14 X |
| 2,586,648 | 2/1952 | Hale et al. | 292/DIG. 5 X |
| 3,704,039 | 11/1972 | Dean | 296/165 X |
| 3,891,252 | 6/1975 | Lehmann | 292/DIG. 5 X |
| 4,007,955 | 2/1977 | Kobayashi | 292/216 |
| 4,157,844 | 6/1979 | Sarosy et al. | 292/DIG. 43 X |
| 4,174,129 | 11/1979 | Schwandt et al. | 292/216 |
| 4,268,076 | 5/1981 | Itoi | 70/279 X |
| 4,302,045 | 11/1981 | McAdams, Sr. | 292/DIG. 5 X |
| 4,836,591 | 6/1989 | Faust | 292/DIG. 14 X |
| 5,595,407 | 1/1997 | ter Horst et al. | 292/DIG. 5 X |

*Primary Examiner*—Lloyd A. Gall
*Attorney, Agent, or Firm*—Browdy and Neimark

[57] ABSTRACT

A latch device arrangement for a vehicle comprises a main engaging assembly attached to a vehicle body, a sub engaging assembly attached to a movable roof which is displaceable between a storing position and a lifted position and engageable with the main assembly for holding the roof in the storing position. The sub assembly has a ratchet for holding the engagement of the main and sub assemblies. The main assembly has a ratchet lever which comes into contact with the ratchet to release the engagement of the main and sub assemblies. The arrangement further has an open lever connected to the ratchet lever, a rotating handle rotating the open lever from a standby position toward an operating position, and a lock pin displaceable between a locked position and an unlocked position.

12 Claims, 6 Drawing Sheets

LATCH DEVICE FOR A VEHICLE

FIELD OF THE INVENTION

The present invention relates to a latch device for a vehicle and particularly relates to a latch device for holding a pop-up roof of a vehicle in a storing position.

PRIOR ART

As shown in FIG. 13, a recreation vehicle having a movable roof called a pop-up roof has recently been sold at markets. A rear edge D of the movable roof A is attached to a vehicle body C by a hinge such that a front edge B of the movable roof A can be substantially moved in a vertical direction with respect to the vehicle body C. The movable roof A is normally held in a storing position parallel to a substantially horizontal flat metal ceiling E of the vehicle body C. When the front edge B of the roof A is moved upward, a space F capable of making an adult approximately lie on the ceiling is formed between the roof A and the ceiling E as shown in FIG. 13. This space F is communicated with an interior room or cabin of the vehicle body C through an opening or entrance G formed in the ceiling E. The space F is used as a relaxing room when the vehicle is parked in a campground, etc. The roof A is held by a latch device in the storing position.

The above latch device has a structure in which a latch state of the device is released by operating an open handle arranged within the interior of the room of the vehicle. Since the roof is very heavy, there is almost no case in which the roof is unexpectedly opened even when the latch state is released. However, when the latch state is released during running of the vehicle, there is a case in which the roof is opened by the influence of a wind pressure.

SUMMARY OF THE INVENTION

Accordingly, an object of the present invention is to provide a latch device for preventing a movable roof from being unexpectedly opened.

Another object of the present invention is to provide a latch device of a simple structure suitable for the movable roof.

DESCRIPTION OF THE PREFERRED EMBODIMENT

Figure 1:
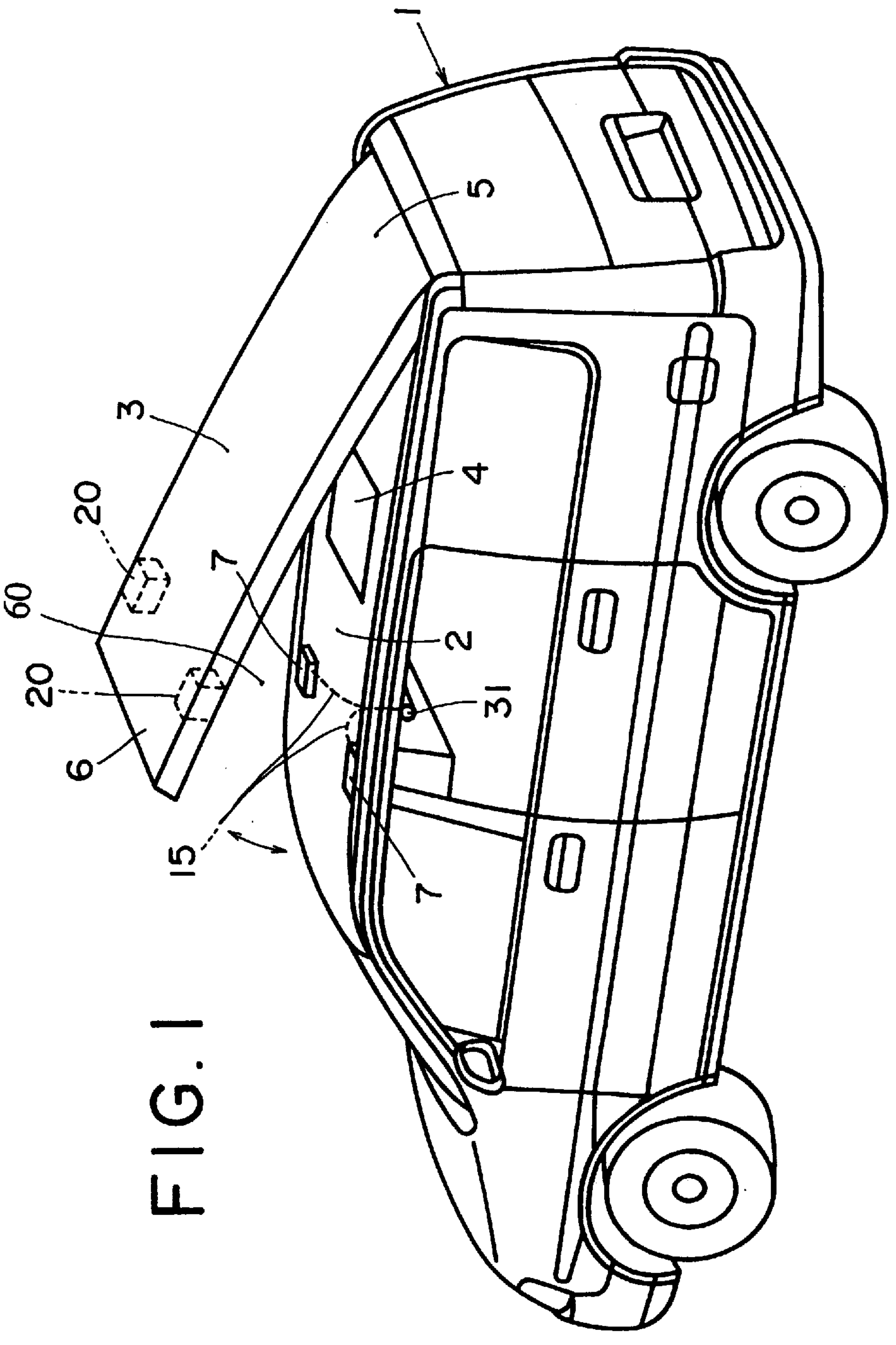
FIG. 1 is a perspective view showing a vehicle having a movable roof called a pop-up roof and a latch device in accordance with the present invention.

The embodiment of the present invention will next be described with reference to the drawings. FIG. 1 shows a vehicle of a wagon type having a movable roof 3 called a pop-up roof arranged in a relatively high position. A rear edge 5 of the roof 3 is attached to a vehicle body 1 by hinges (not shown) such that a front edge 6 of the roof 3 can be substantially moved in a vertical direction with respect to the vehicle body 1. The roof 3 is normally held in a storing position parallel to a substantially horizontal flat metal ceiling 2 of the vehicle body 1. When the front edge 6 of the roof 3 is moved upward, a space 60 capable of making an adult approximately lie on the ceiling is formed between the roof 3 and the ceiling 2 as shown in FIG. 1. This space 60 is communicated with the interior of a room of the vehicle body 1 through an opening or entrance 4 formed in the ceiling 2. The space 60 can be used as a relaxing room when the vehicle is parked in a campground, etc. The lifted roof 3 is held by an unillustrated holding device in a lifted position. An unillustrated curtain or the like is desirably attached between a circumferential edge of the roof 3 and a circumferential edge of the ceiling 2.

Figure 2:
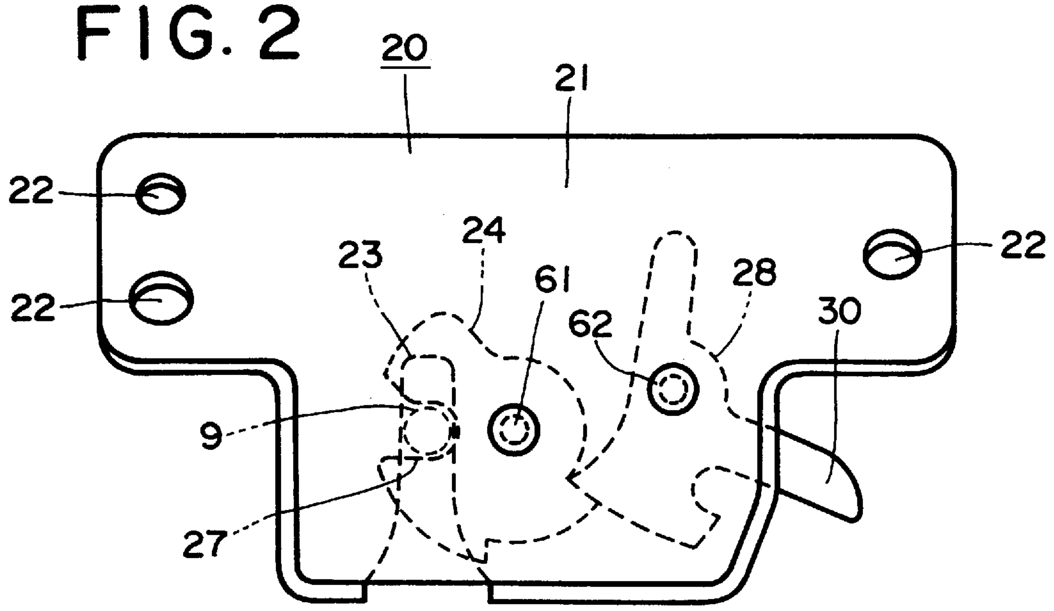
FIG. 2 is a front view of a first (sub) engaging assembly.
Figure 3:
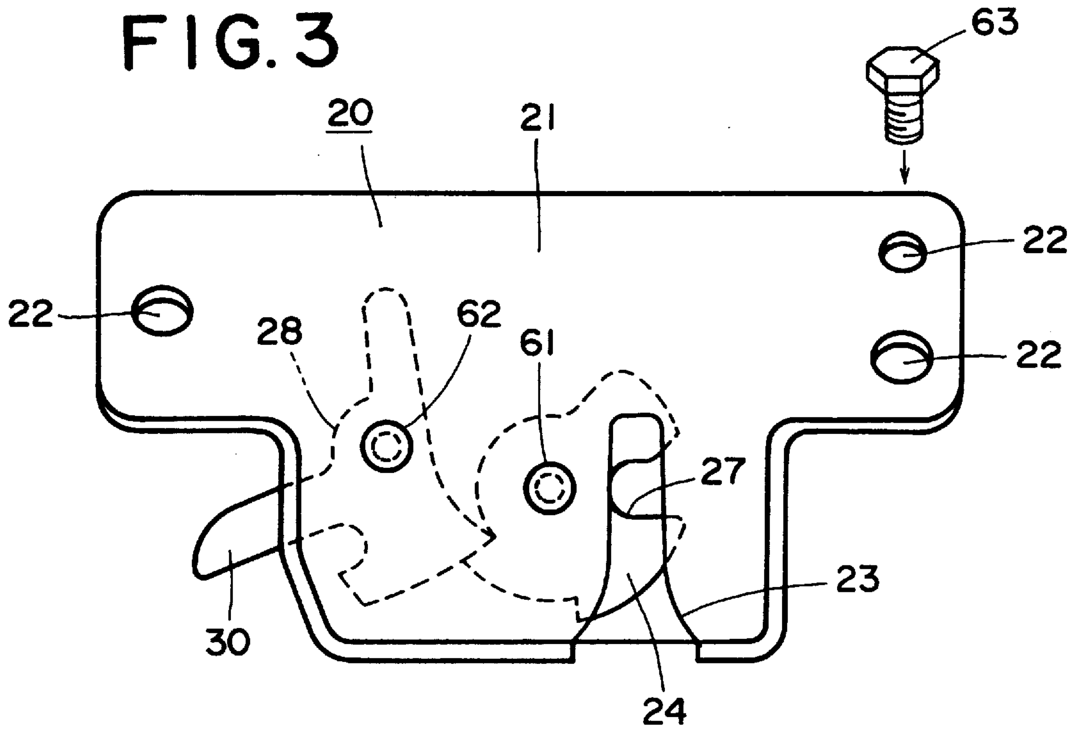
FIG. 3 is a rear view of the first engaging assembly.
Figure 4:
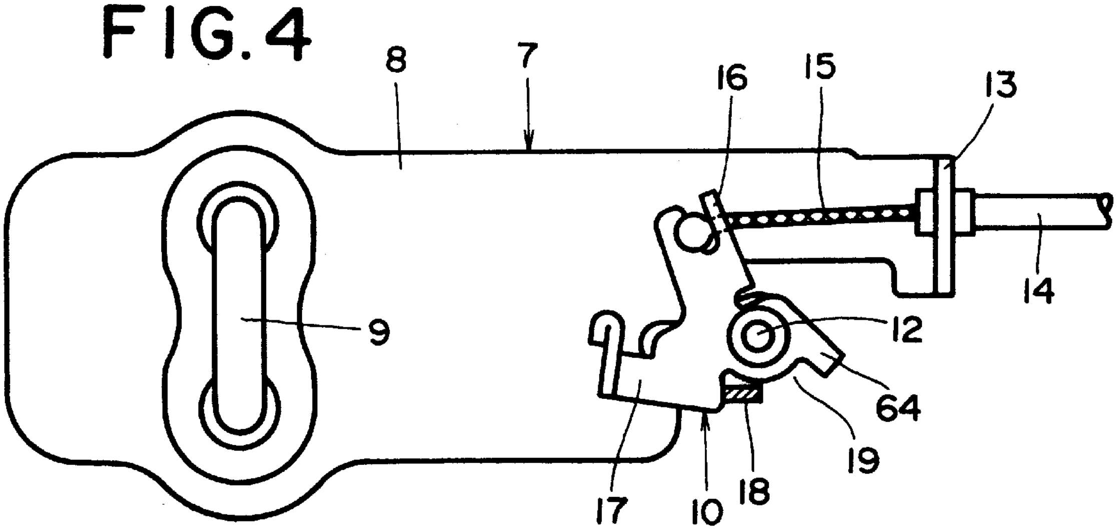
FIG. 4 is a front view of a second (main) engaging assembly.

First (sub) engaging assemblies 20, 20 are arranged on both left-hand and right-hand sides of the roof 3, and second (main) engaging assemblies 7, 7 are attached to both left-hand and right-hand sides of the ceiling 2. The second engaging assemblies 7, 7 are respectively engaged with the first engaging assemblies 20, 20 so as to hold the roof 3 in the storing position when the roof 3 is displaced to the storing position. The first engaging assemblies 20, 20 have a structure with left-hand and right-hand symmetry. As shown in FIGS. 2 and 3, each first engaging assembly 20 has a metal frame 21 fixed to the roof 3 by bolts 63, a latch 24 pivotally mounted on the frame 21 through a shaft 61, and a ratchet 28 pivotally supported on the frame 21 through a shaft 62. In FIG. 2, the latch 24 is biased by an unillustrated spring in the counterclockwise direction and the ratchet 28 is also biased by an unillustrated spring in the clockwise direction. When the roof 3 is closed, a U-shaped groove 27 of the latch 24 is engaged with a striker 9 of the second engaging assembly 7 and the ratchet 28 is then engaged with the latch 24 so as to hold the engagement of the latch 24 and the striker 9. The metal frame 21 of the first assembly 20 has holes 22 into which the bolts 63 are inserted, and a notch portion 23 for receiving the striker 9 when the roof 3 is stored or closed.

The second engaging assemblies 7, 7 also have a structure with left-hand and right-hand symmetry. Each of the second engaging assemblies 7 has a metal base plate 8 which is fixed to the ceiling 2. The striker 9 of the second assembly 7 is fixed to one side of the base plate 8, and a ratchet lever 10 is rotatably supported on the other side of the base plate 8 by a shaft 12 parallel to a transversal direction of the vehicle body 1. The ratchet lever 10 has plural arms 16, 17, 64 extending in a radial direction of the shaft 12. An end portion of a wire cable 15 is engaged with the arm 16. A sheath 14 of the cable 15 is fixed to a bent portion 13 formed in the base plate 8. A notch portion 19 is formed between the arms 17 and 64, and a projection 18 of the base plate 8 is positioned in the notch portion 19. The ratchet lever 10 is rotated by a distance equal to the clearance between the projection 18 and the notch portion 19.

Figure 12:
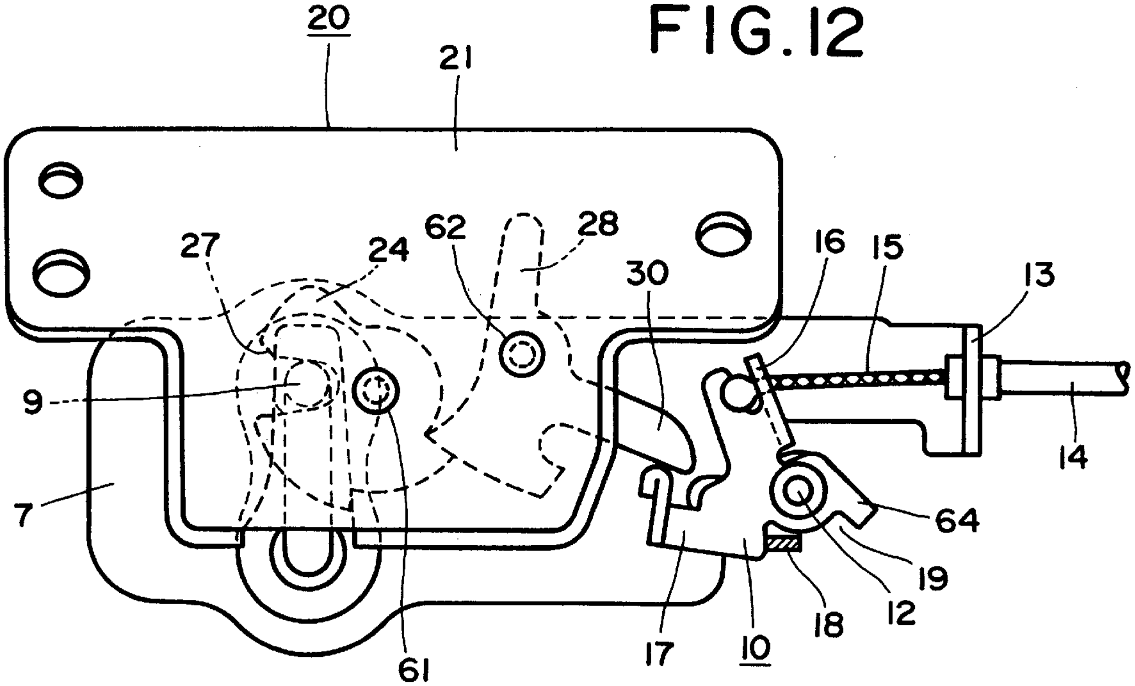
FIG. 12 is a front view showing a state in which a latch of the first engaging assembly is engaged with the striker of the second engaging assembly.
Figure 13:
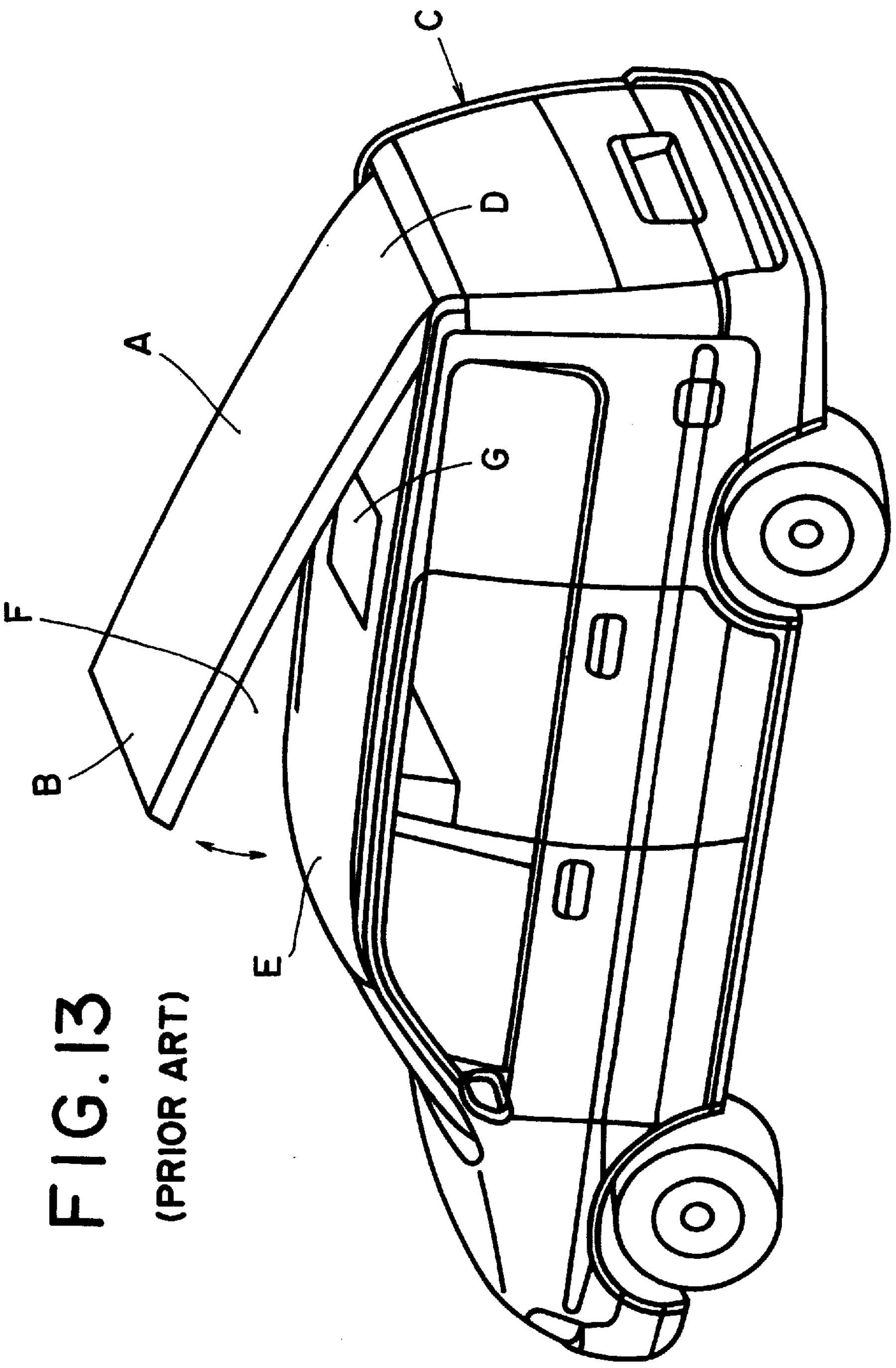
FIG. 13 (PRIOR ART)
FIG. 13 is a perspective view showing a conventional vehicle having a movable roof.

The ratchet 28 of the first engaging assembly 20 has a leg portion 30. When the roof 3 is in the storing position, i.e., when the striker 9 and the latch 24 are engaged with each other as shown in FIG. 12, the leg portion 30 of the ratchet 28 is arranged to locate in the vicinity of the arm 17 of the ratchet lever 10 so that the arm 17 comes into contact with the leg portion 30 and rotates the ratchet 28 so as to release the engagement of the latch 24 and the striker 9 when the ratchet lever 10 is rotated in the clockwise direction in FIG. 12. When the engagement of the latch 24 and the striker 9 is released, the roof 3 can be displaced from the storing position to the lifted position.

Figure 5:
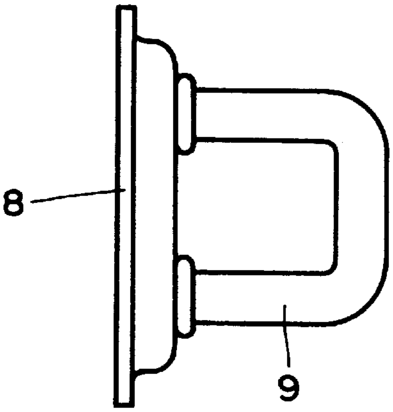
FIG. 5 is a side view of the second engaging assembly.
Figure 6:
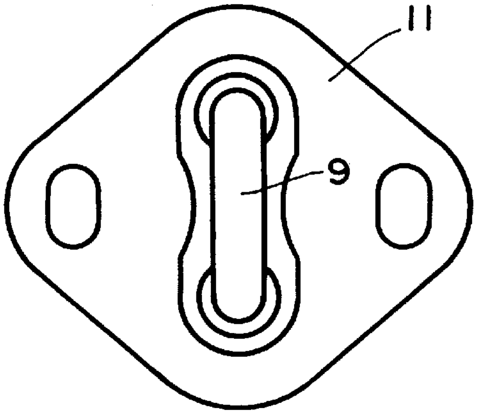
FIG. 6 is a front view of a striker of the second engaging assembly.
Figure 9:
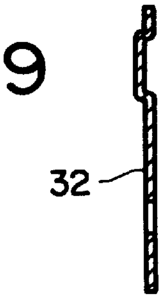
FIG. 9 is a cross-sectional view taken along line 9—9 of FIG. 8.
Figure 7:
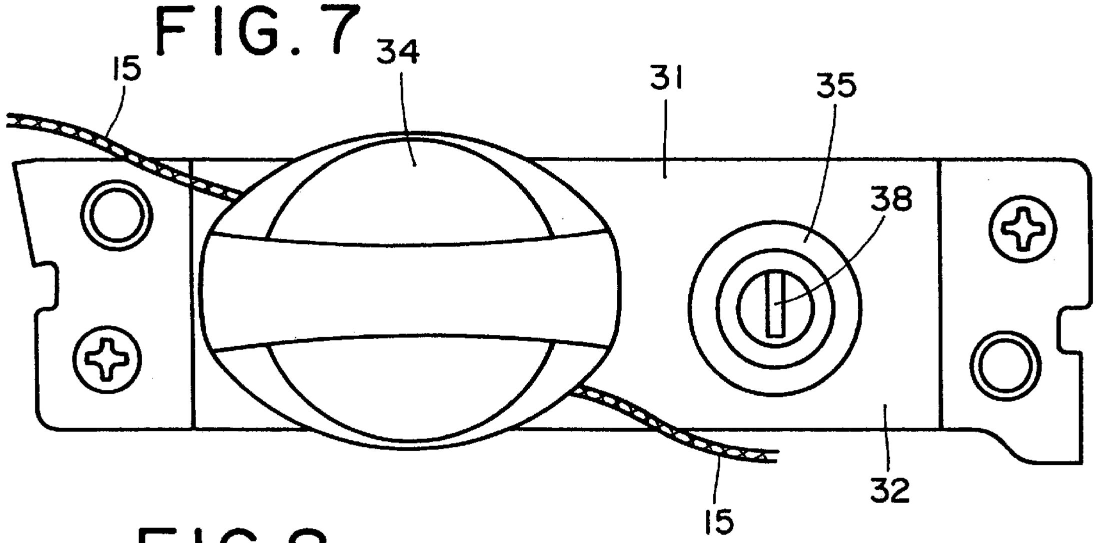
FIG. 7 is a front view of a releasing assembly.

As shown in FIG. 5, the striker 9 of the second assembly 7 is formed by an approximately U-shaped rod. The striker 9 is directly fixed to the base plate 8 or is fixed to a rhombic bracket 11 as shown in FIG. 6 which is fixed to the base plate 8. The striker 9 and the ratchet lever 10 are arranged in a mutual accurate position relation by attaching the striker 9 and the ratchet lever 10 to the same plate 8. Therefore, the position relation of the ratchet 28 and the ratchet lever 10 also becomes accurate.

Figure 11:
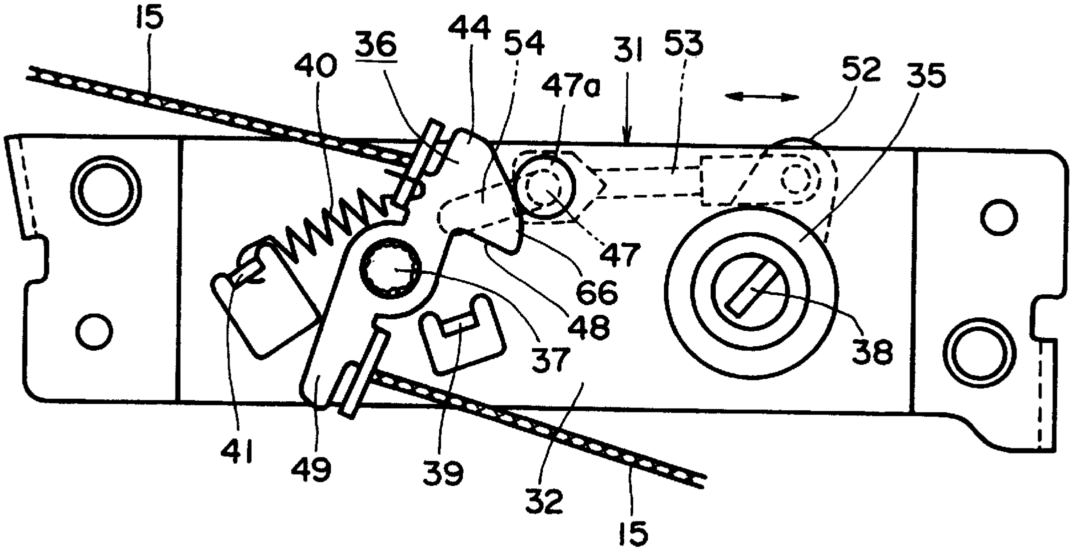
FIG. 11 is a front view showing a state in which an open lever of FIG. 8 is rotated to an operating position.

As shown in FIG. 1, an opening device 31 is installed on the interior room of the vehicle body 1. As shown in FIGS. 7 to 11, the opening device 31 has a metal base plate 32 fixed to the vehicle body 1, a rotating handle 34 and a key cylinder 35. The rotating handle 34 is fixed to an end tip of a shaft 37 rotatably attached to the base plate 32. The shaft 37 fixedly supports an open lever 36 having two arms 44, 49 such that the open lever 36 is rotated by operating the rotating handle 34. A spring 40 is arranged between a projection 41 of the base plate 32 and the open lever 36. The open lever 36 is biased in the counterclockwise direction in FIG. 8 and comes into contact with a projection 39 of the base plate 32. The cables 15, 15 extending to the ratchet levers 10, 10 of the second engaging assemblies 7, 7 are respectively fixedly attached to the arms 44, 49. When the open lever 36 is rotated by the rotating handle 34 in the clockwise direction as shown in FIG. 11, the ratchet levers 10, 10 are rotated so that the engagement of the latch 24 and the striker 9 is released.

The key cylinder 35 is fixed to one side of the base plate 32. A key lever 52 is fixed to a rear end of the key cylinder 35. The key lever 52 is rotated when the key cylinder 35 is operated by a suitable key which is inserted into a key groove 38 of the key cylinder 35. One end of a rod 53 is connected to the key lever 52 and the other end of the rod 53 is fixed to a lock pin 47 parallel to the shaft 37. The lock pin 47 projects toward a front side of the base plate 32 through a slot 54 formed in the base plate 32.

Figure 8:
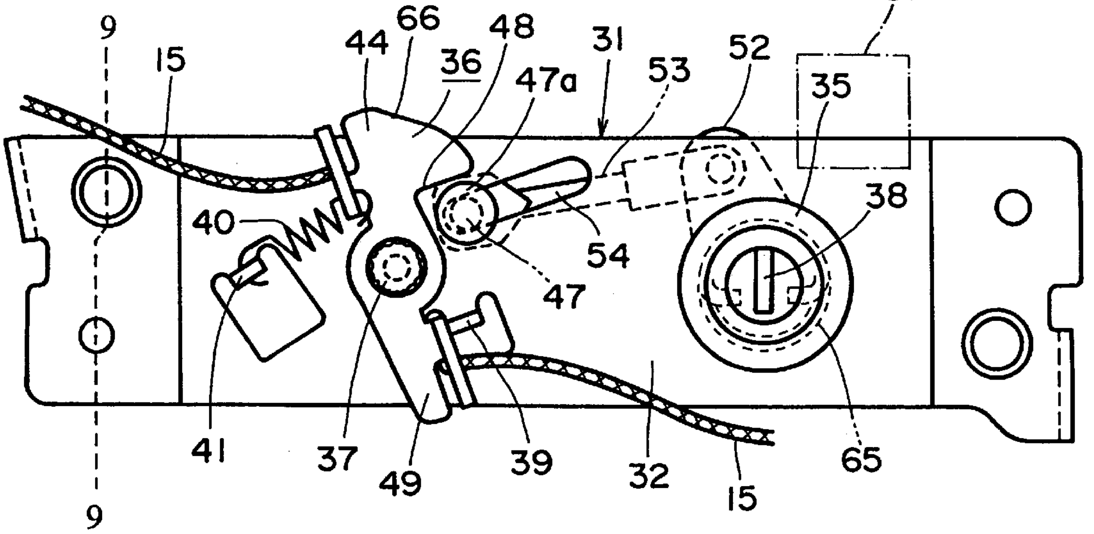
FIG. 8 is a front view showing a state in which a rotating handle is detached from the releasing assembly of FIG. 7.
Figure 10:
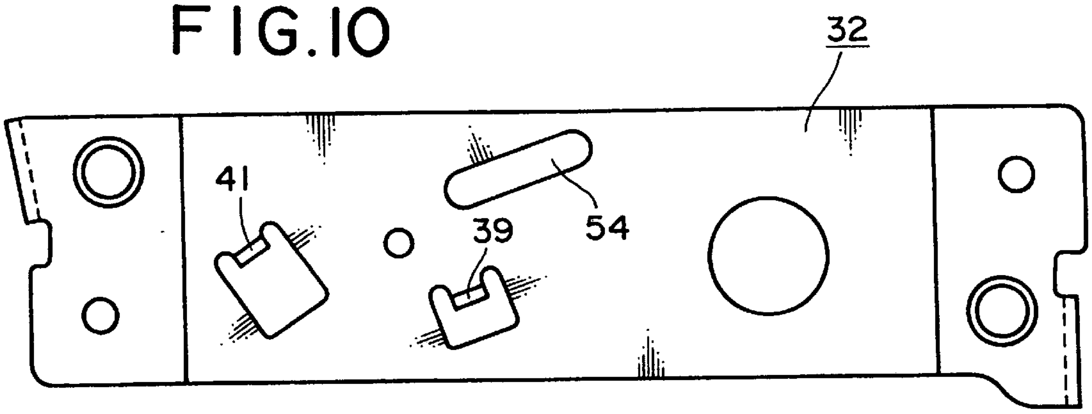
FIG. 10 is a front view of a metal base plate of the releasing assembly.

The key cylinder 35 is normally held by the resilient force of a built-in spring 65 of the cylinder in a locked position shown in FIG. 8. At this state, the lock pin 47 is located in a locked position at a left-hand end of the slot 54 as shown in FIG. 8 and is opposed to an engaging face 48 formed in the arm 44 of the open lever 36. Accordingly, when the lock pin 47 is located in the locked position, no open lever 36 can be rotated by the rotating handle 34.

When the key inserted into the key groove 38 is rotated against the resilient force of the spring 65 with the right hand of an operator, the lock pin 47 is slid toward the right-hand side and is displaced to an unlocked position. In this state, when the rotating handle 34 is rotated with the left hand of the operator, the open lever 36 is rotated so that the ratchet 28 can be separated from the latch 24, and the roof 3 is then lifted upward with the right hand, thereby the roof 3 can be displaced to the lifted position.

When the operator's hand is separated from the key, the lock pin 47 which slid to the unlocked position by the key operation is moved toward the locked position by the resilient force of the spring 65, and comes into contact with a side or outer face 66 of the open lever 36 (see FIG. 11). At this time, when the frictional resistance between the lock pin 47 and the side face 66 is strong, no open lever 36 can be smoothly returned to a standby position of FIG. 8 by only the resilient force of the spring 40. Therefore, in the present invention, the side face 66 is formed on a cam face having a radius measured from the shaft 37 which increases gradually from the one side near to the engaging face 48 to the other side of the side face 66 so that the open lever 36 is rotated toward the standby position by a contact with the lock pin 47. Thus, the open lever 36 is substantially biased by the resilient force of each of the two springs 40 and 65 in the counterclockwise direction. Further, a rotatable roller 47*a* may be attached to the lock pin 47 for reducing the frictional resistance between the lock pin 47 and the side face 66, thereby the open lever 36 can be further smoothly returned to the standby position.

An actuator 67 having a solenoid or a motor for moving the lock pin 47 from the locked position to the unlocked position can be attached to the base plate 32.

What is claimed is:

1. A latch device arrangement for a vehicle comprising:

a substantially horizontal flat metal ceiling of the vehicle;

a movable roof provided above the ceiling and having a rear end portion rotatably attached to a vehicle body such that a front end portion of the movable roof is substantially moved in a vertical direction of the vehicle body, said movable roof being displaceable between a storing position in which the movable roof is substantially parallel to the ceiling and a lifted position in which the movable roof is inclined with respect to the ceiling for forming a space between the movable roof and the ceiling;

an entrance formed in the ceiling and communicating an interior room of the vehicle and the space with each other;

a main engaging assembly attached to the vehicle body and having a striker;

a sub engaging assembly attached to the movable roof and holding the roof in the storing position in cooperation with the main engaging assembly, said sub engaging assembly having a latch which is engaged with the striker when the movable roof is displaced into the storing position, and a ratchet for holding the engagement of the striker and the latch by engaging with the latch;

said main engaging assembly having a ratchet lever which comes into contact with the ratchet to release the ratchet from the latch when the ratchet lever is rotated when the movable roof is in the storing position;

an open lever rotatably attached to the vehicle body and connected to the ratchet lever;

a rotating handle rotatably attached to the vehicle body and rotating the open lever from a standby position toward an operating position; and a lock mechanism attached to the vehicle body and displaceable between a locked state for disabling the rotation of the open lever and an unlocked state for enabling the rotation of the open lever.

2. The latch device arrangement according to claim 1, wherein said lock mechanism has a key cylinder which is held in a locked position by a resilient force of a spring.

3. The latch device arrangement according to claim 2, wherein said lock mechanism has a lock pin which is displaced from a locked position to an unlocked position by a rotation of the key cylinder.

4. The latch device arrangement according to claim 3, wherein said open lever has an engaging face which is engageable with the lock pin located in the locked position.

5. The latch device arrangement according to claim 4, wherein said open lever has a cam face with which the lock pin comes into contact when the lock pin is moved toward the locked position by the resilient force of the spring of the lock mechanism while the open lever is located in a position except for the standby position, and said cam face has a profile capable of rotating the open lever toward the standby position by a contact with the lock pin.

6. The latch device arrangement according to claim 5, wherein said lock pin has a rotatable roller which comes in contact with the cam face.

7. The latch device arrangement according to claim 4, wherein said lock pin has a rotatable roller which comes in contact with the open lever by the resilient force of the spring of the lock mechanism.

8. The latch device arrangement according to claim 7, wherein said open lever has a cam face with which the roller comes into contact when the roller is moved toward the locked position by the resilient force of the spring of the lock mechanism while the open lever is located in a position except for the standby position, and said cam face has a profile capable of rotating the open lever toward the standby position by a contact with the roller.

9. The latch device arrangement according to claim 1, wherein said striker and said ratchet lever are attached to the same metal plate.

10. The latch device arrangement according to claim 1, wherein said open lever and said lock mechanism are attached to the same metal bracket.

11. The latch device arrangement according to claim 1, wherein said lock mechanism has a lock pin which is displaced between a locked position and an unlocked position, and an actuator for moving the lock pin toward the unlocked position.

12. The latch device arrangement according to claim 11, wherein said actuator has a solenoid.

* * * * *